United States Patent
Ji

(10) Patent No.: US 11,638,328 B2
(45) Date of Patent: Apr. 25, 2023

(54) MULTI-MODE COMMUNICATION METHOD, TERMINAL, AND NETWORK SIDE DEVICE

(71) Applicant: VIVO MOBILE COMMUNICATION CO., LTD., Dongguan (CN)

(72) Inventor: Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 236 days.

(21) Appl. No.: 17/167,048

(22) Filed: Feb. 3, 2021

(65) Prior Publication Data
US 2021/0160965 A1 May 27, 2021

Related U.S. Application Data

(63) Continuation of application No. PCT/CN2019/099237, filed on Aug. 5, 2019.

(30) Foreign Application Priority Data
Aug. 6, 2018 (CN) .......................... 201810887039.8

(51) Int. Cl.
*H04W 76/14* (2018.01)
*H04W 88/06* (2009.01)
(Continued)

(52) U.S. Cl.
CPC ........... *H04W 88/06* (2013.01); *H04W 36/14* (2013.01); *H04W 48/18* (2013.01); *H04W 72/23* (2023.01); *H04W 76/14* (2018.02)

(58) Field of Classification Search
CPC ..... H04W 88/06; H04W 36/14; H04W 48/18; H04W 72/042; H04W 76/14;
(Continued)

(56) References Cited

U.S. PATENT DOCUMENTS

2016/0302246 A1* 10/2016 Chervyakov ....... H04L 27/2665
2017/0111145 A1*  4/2017 Höglund ............... H04L 1/1854
(Continued)

FOREIGN PATENT DOCUMENTS

CN          103368590 A     10/2013
CN          107637161 A      1/2018
(Continued)

OTHER PUBLICATIONS

Second Office Action issued in related Chinese Application No. 201810887039.8, dated May 19, 2021, 7 pages.
(Continued)

*Primary Examiner* — Julio R Perez
(74) *Attorney, Agent, or Firm* — IPX PLLC

(57) ABSTRACT

The disclosure provides a multi-mode communication method, a terminal, and a computer readable storage medium thereof. The method may be applied to the terminal, where the terminal may support at least two communication modes and include at least two internal communication modules respectively corresponding to the at least two communication modes. The method may include sending, by the terminal, resource related information, where the sent resource related information includes resource related information of at least one of the at least two communication modes.

20 Claims, 6 Drawing Sheets

Receive resource related information from a terminal, where the terminal supports at least two communication modes, and the resource related information includes resource related information of at least one of the at least two communication modes — 51

Schedule data of at least one of the at least two communication modes for the terminal according to the resource related information — 52

(51) Int. Cl.
*H04W 36/14* (2009.01)
*H04W 48/18* (2009.01)
*H04W 72/23* (2023.01)

(58) Field of Classification Search
CPC ......... H04W 72/1215; H04W 72/1226; H04W 28/04; H04W 74/085
See application file for complete search history.

(56) References Cited

U.S. PATENT DOCUMENTS

| | | | |
|---|---|---|---|
| 2018/0054237 A1 | 2/2018 | Tseng et al. | |
| 2018/0139673 A1* | 5/2018 | Peisa | H04W 36/38 |
| 2018/0220366 A1* | 8/2018 | Bergström | H04W 76/28 |
| 2021/0160965 A1* | 5/2021 | Ji | H04W 88/06 |
| 2022/0070876 A1* | 3/2022 | Bangolae | H04W 24/08 |
| 2022/0159628 A1* | 5/2022 | Bangolae | H04W 72/04 |
| 2022/0272666 A1* | 8/2022 | Ji | H04W 52/283 |

FOREIGN PATENT DOCUMENTS

| | | |
|---|---|---|
| CN | 107996031 A | 5/2018 |
| CN | 108112087 A | 6/2018 |
| CN | 108234235 A | 6/2018 |
| WO | 2014126776 A1 | 8/2014 |
| WO | 2017192164 A1 | 11/2017 |
| WO | 2018006313 A1 | 1/2018 |

OTHER PUBLICATIONS

International Search Report issued in corresponding International Application No. PCT/CN2019/099237, dated Oct. 29, 2019, 4 pages.
First Office Action issued in related Chinese Application No. 201810887039.8, dated Dec. 20, 2020, 11 pages.

* cited by examiner

Send resource related information, where the resource related information includes resource related information of at least one of at least two communication modes — 11

FIG. 1

Send resource related information to a network side device, where the resource related information includes at least one of the following: resource candidate information and resource perception information of another communication mode — 21

FIG. 2

A first internal communication module of a terminal sends resource related information to a second internal communication module of the terminal — 31

FIG. 3

A terminal sends resource related information to another terminal, where the resource related information includes resource indication information — 41

FIG. 4

MULTI-MODE COMMUNICATION METHOD, TERMINAL, AND NETWORK SIDE DEVICE

CROSS-REFERENCE TO RELATED APPLICATIONS

This application is a bypass continuation of PCT Application No. PCT/CN2019/099237 filed Aug. 5, 2019, which claims priority to Chinese Patent Application No. 201810887039.8, filed on Aug. 6, 2018 in China, both of which are incorporated herein by reference in their entireties.

TECHNICAL FIELD

Embodiments of the present disclosure relate to the field of wireless communications technologies, and in particular, to a multi-mode communication method, a terminal, and a network side device.

BACKGROUND

Long Term Evolution (LTE) system starts to support sidelink from the 12th released edition. It is used for direct data transmission between user equipment (UE), without using network devices. The design of LTE sidelink is applicable for specific public safety affairs (such as emergency communications for disaster circumstances of fire emergency or earthquake, and so on) or vehicle to everything (V2X) communications, and so on. V2X communications include various businesses, such as basic security-related communications, advanced driving (autonomous driving), formation, sensor extension, and so on. As LTE sidelink only supports broadcast communication, it is mainly used for basic security-related communications; other advanced V2X businesses can be supported by New Radio (NR) sidelink.

So, it is necessary for UE to support sidelink multi-mode communication, which enables different modules simultaneously to support different businesses. Besides, sidelink multi-mode communication is also applicable when a UE is roaming among different areas, or when the network is transited from one mode to another.

However, as sidelink is a half-duplex working mode, if LTE sidelink and NR sidelink multi-mode communications work without harmony, it might cause data sending and receiving confliction when one side is receiving data, while the other side is sending data. On the other hand, V2X business can work simultaneously on sidelink interface and Uu interface (that is, downlink and uplink). Different modes of sidelink interface and Uu interface might also have confliction, such as when one side is sending sidelink data, while the other side is receiving downlink data. So, different modes of sidelink interface and Uu interface need to be coordinated correspondingly. Besides, even if the data sending and receiving timing is well coordinated, it might have other problems such as signal modulation distortion, harmonic wave interference, and cross-modulation interference, and so on if data is transmitted under different modes at the same time.

SUMMARY

Embodiments of the present disclosure provide a multi-mode communication method, a terminal, and a network side device to resolve problems of data sending and receiving confliction and/or power limitation and interference, and so on when UE is performing multi-mode data sending and receiving.

To resolve the technical problem, the present disclosure is implemented as follows:

According to a first aspect, an embodiment of the present disclosure provides a multi-mode communication method applied to a terminal, where the terminal supports at least two communication modes and the method includes:

sending resource related information, where the resource related information includes resource related information of at least one of the at least two communication modes.

According to a second aspect, an embodiment of the present disclosure provides a multi-mode communication method applied to a network side device, where the method includes:

receiving resource related information from a terminal, where the terminal supports at least two communication modes. The resource related information includes resource related information of at least one of the at least two communication modes; and scheduling the data of the at least one of the at least two communication modes for the terminal according to the resource related information.

According to a third aspect, an embodiment of the present disclosure provides a multi-mode communication method applied to a terminal, where the terminal supports at least two communication modes and the method includes:

receiving resource related information from another terminal, where the another terminal supports at least two communication modes, and the resource related information includes resource related information of at least one of the at least two communication modes.

According to a fourth aspect, an embodiment of the present disclosure provides a terminal, where the terminal supports at least two communication modes and includes:

a sending module, configured to send resource related information, where the resource related information includes resource related information of at least one of the at least two communication modes.

According to a fifth aspect, an embodiment of the present disclosure provides a network side device, including:

a receiving module, configured to receive resource related information from a terminal, where the resource related information supports at least two communication modes, and the resource related information includes resource related information of at least one of the at least two communication modes; and a scheduling module, configured to schedule the data of the at least one of the at least two communication modes for the terminal according to the resource related information.

According to a sixth aspect, an embodiment of the present disclosure provides a terminal, where the terminal supports at least two communication modes and includes:

a receiving module, configured to receive resource related information from another terminal, where the another terminal supports at least two communication modes, and the resource related information includes resource related information of at least one of the at least two communication modes.

According to a seventh aspect, an embodiment of the present disclosure provides a terminal, including a processor, a memory, and a computer program stored in the memory and executable on the processor, where when the computer program is executed by the processor, the steps of the multi-mode communication method that applied to the terminal are implemented.

According to an eighth aspect, an embodiment of the present disclosure provides a network side device, including a processor, a memory, and a computer program stored in the memory and executable on the processor, where when the computer program is executed by the processor, the steps of the multi-mode communication method that applied to the network side device are implemented.

According to a ninth aspect, an embodiment of the present disclosure provides a computer readable storage medium. The computer readable storage medium stores a computer program, and when the computer program is executed by the processor, steps of the multi-mode communication method that applied to the terminal or the network side device are implemented.

In an embodiment of the present disclosure, a terminal sends resource related information of at least one of the at least two communication modes, and the terminal that receives the resource related information can effectively coordinate the communications among different communication modes, reduce or avoid multi-mode data sending and receiving confliction and/or power limitation and interference problems, and improve communication efficiency according to the resource related information.

BRIEF DESCRIPTION OF DRAWINGS

It becomes clear for a person of ordinary skill in the art to learn various other advantages and benefits by reading a detailed description of the following optional implementation manners. Accompanying drawings are merely used for showing the optional implementation manners, and are not considered as a limitation on the present disclosure. In all accompanying drawings, a same reference symbol is used to indicate a same part. In the accompanying drawings:

FIG. 1 is a first schematic flowchart of a multi-mode communication method according to an embodiment of the present disclosure;

FIG. 2 is a second schematic flowchart of a multi-mode communication method according to an embodiment of the present disclosure;

FIG. 3 is a third schematic flowchart of a multi-mode communication method according to an embodiment of the present disclosure;

FIG. 4 is a fourth schematic flowchart of a multi-mode communication method according to an embodiment of the present disclosure;

DETAILED DESCRIPTION OF EMBODIMENTS

Figure 5:
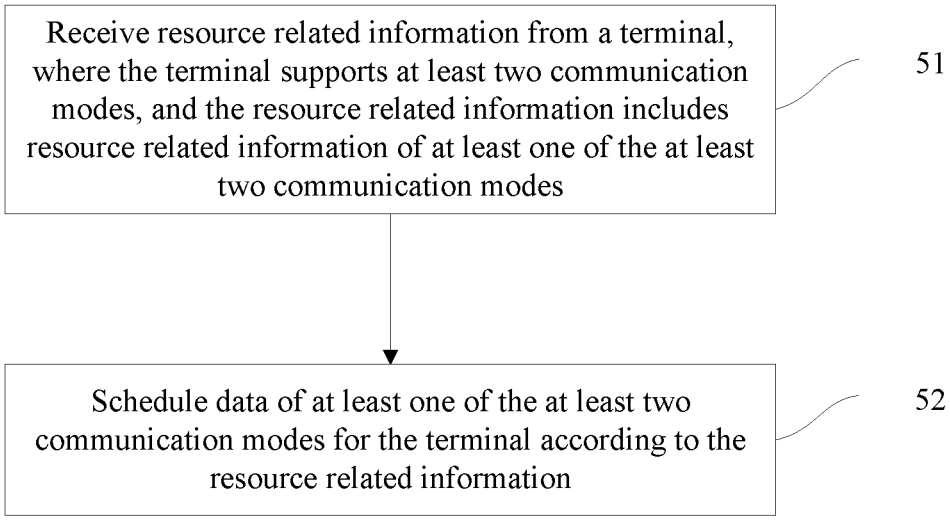
FIG. 5 is a fifth schematic flowchart of a multi-mode communication method according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of this disclosure, the term such as "exemplary" or "for example" is used to represent an example, an instance, or an illustration. Any embodiment or design scheme described as an "exemplary" or "example" in the embodiments of the present disclosure should not be explained as being more preferred or having more advantages than another embodiment or design scheme. Exactly, use of the word such as "exemplary" or "example" is intended to present a concept in a specific manner.

FIG. 1 is a first schematic flowchart of a multi-mode communication method according to an embodiment of the present disclosure. The multi-mode communication method is applied to a terminal, where the terminal supports at least two communication modes and the method includes the following step:

Step 11: Send resource related information, where the resource related information includes resource related information of at least one of the at least two communication modes.

In an embodiment of the present disclosure, a terminal sends resource related information of at least one of the at least two communication modes, and the terminal that receives the resource related information can effectively coordinate the communications among different communication modes, reduce or avoid multi-mode data sending and receiving confliction and/or power limitation and interference problems, and improve communication efficiency according to the resource related information.

In some embodiments of the present disclosure, the at least two communication modes include at least two of the following: a new radio sidelink (NR sidelink) communication mode, a long term evolution sidelink (LTE sidelink) communication mode, an NR Uu communication mode, an LTE Uu communication mode, a Wireless Access in Vehicular Environments (WAVE) communication mode, an Intelligent Transport Systems-G5 (ITS-G5) communication mode, an Intelligent Transport Systems/Electronic Toll Collection (ITS/ETC) communication mode, and a Dedicated Short Range Communications (DSRC) communication mode.

The NR Uu communication mode includes: an NR uplink communication mode and an NR downlink communication mode. NR Uu is an interface between a terminal and a network side device of an NR network.

The LTE Uu communication mode includes: an LTE uplink communication mode and an LTE downlink communication mode. LTE Uu is an interface between a terminal and a network side device of an LTE network.

FIG. 2 is a second schematic flowchart of a multi-mode communication method according to an embodiment of the present disclosure. The multi-mode communication method is applied to a terminal, where the terminal supports at least two communication modes and the method includes the following step:

Step 21: Send resource related information to a network side device, where the resource related information includes at least one of the following: the resource candidate information and resource sensing information of another communication mode, the another communication modes refers to part or all of the communications modes except the first communication mode among the at least two communication modes, and the first communication mode is the communication mode between the terminal and network side device.

In an embodiment of the present disclosure, a terminal sends the resource candidate information and/or resource sensing information of another communication mode to a network side device, so that the network side device can effectively coordinate the communications among different communication modes, reduce or avoid multi-mode data sending and receiving confliction and/or power limitation and interference problems, and improve communication efficiency according to the resource candidate information and/or resource sensing information.

In some embodiments of the present disclosure, the network side device can be LTE base station (Evolved Node B, eNB), NR base station (next Generation Node B, gNB), or LTE/NR dual connectivity base station (E-Universal Terrestrial Radio Access New Radio—Dual Connectivity, EN-DC or NR-E-Universal Terrestrial Radio Access—Dual Connectivity, NE-DC). Of course, it also can be other evolved communication system base stations in the future.

In some embodiments of the present disclosure, the resource candidate information of the another communication mode includes at least one of the following:

1) Resource allocation information of the resource pool.

The resource refers to the usable or recommended transmission resource and/or monitoring resource of the another communication mode. The transmission resource is the sending resource and the monitoring resource is the receiving resource.

2) Synchronized information of the candidate transmission resource.

3) Synchronized information of the reserved transmission resource.

The synchronized information stated in 2) and 3) can include at least one of the following: synchronization source, synchronization signal, and timing information. The timing information refers to the timing alignment information of the receiving and sending terminals.

4) At least one of the following: timing domain information, frequency domain information, and spatial domain information for the candidate transmission resource.

5) At least one of the following: timing domain information, frequency domain information, and spatial domain information for the reserved transmission resource.

6) At least one of the following: timing domain information, frequency domain information, and spatial domain information for the candidate monitoring resource.

7) At least one of the following: timing domain information, frequency domain information, and spatial domain information for the reserved monitoring resource.

The timing domain information stated in 4)-7) includes at least one of the following: offset information, duration information, cycle, pattern information, and so on. The duration is the time of duration of the resource, usually indicated by multiple Orthogonal Frequency Division Multiplexing (OFDM) symbols, time slots, sub-frames, and so on.

The frequency domain information stated in 4)-7) includes at least one of the following: frequency point, subcarrier spacing, resource block location, and so on.

The spatial domain information stated in 4)-7) includes beam information and so on.

8) Power allocation information for the candidate transmission resource.

9) Power allocation information for the reserved transmission resource.

The power allocation information stated in 8) and 9) includes at least one of the following: allocated power, power headroom, and so on.

In some embodiments of the present disclosure, the resource sensing information of the another communication mode includes at least one of the following:

1) Interference information.

The interference information can include at least one of the following: interference timing domain information, interference band information, interference carrier information, interference spatial domain information, interference direction, interference type, and interference source.

Interference timing domain information includes at least one of the following: interference timing domain pattern information, interference timing domain offset information, duration, cycle, and so on.

The interference spatial domain information can include interference beam information.

The interference direction can include at least one of the following: uplink direction, downlink direction, sidelink direction, and so on.

The interference type can include at least one of the following: WAVE, ITS-G5, DSRC, ITS/ETC, and so on.

2) Channel occupancy rate.

3) Channel busy rate.

FIG. 3 is a third schematic flowchart of a multi-mode communication method according to an embodiment of the present disclosure. The multi-mode communication method is applied to a terminal, where the terminal supports at least two communication modes and the method includes the following step:

Step 31: The first internal communication module of a terminal sends the resource related information to the second internal communication module of the terminal. The terminal includes at least two internal communication modules. Every internal communication module is corresponding to a communication mode. The second internal communication module refers to part or all of the internal communication modules except the first internal communication module among the at least two communication modules. The resource related information includes at least one of the following: the resource candidate information of the second communication mode and the resource sensing information of another communication mode. The second communication mode is the communication mode corresponding to the first internal communication module. The another communication mode refers to part or all of the communication modes except the second communication mode among the at least two communication modes.

The second internal communication module can have one or more modules. When there is only one module, the second internal communication module is corresponding to one communication mode; when there are two or more modules, every second internal communication module is corresponding to a communication mode.

In an embodiment of the present disclosure, the another communication mode can include or exclude the communication mode corresponding to the second internal communication module.

For instance, a terminal includes three internal communication modules: an internal communication module 1, an internal communication module 2, and an internal communication module 3. Every internal communication module is corresponding to a communication mode. The internal communication module 1 sends resource related information to the internal communication module 2. The resource related information includes at least one of the following: the resource candidate information of the communication mode of the internal communication module 1 and the resource sensing information of the communication mode of the internal communication module 3.

Or, the internal communication module 1 sends resource related information to internal communication module 2. The resource related information includes at least one of the following: the resource candidate information of the communication mode of the internal communication module 1, the resource sensing information of the communication mode of the internal communication module 2 and the resource sensing information of the communication mode of the internal communication module 3.

In an embodiment of the present disclosure, the first internal communication module of the terminal sends the resource candidate information of its corresponding communication mode and/or the resource sensing information of another communication mode to the second internal communication module, which enables the second internal communication module to perform data sending and receiving, to reduce or avoid multi-mode data sending and receiving confliction and/or power limitation and interference problems, or to discard part of the data among multiple modules when there is confliction or potential confliction, and improve communication efficiency according to the resource candidate information and/or resource sensing information.

In some embodiments of the present disclosure, the terminal can include at least two of the following modules: an NR sidelink communication module, an LTE sidelink communication module, an NR Uu communication module, an LTE Uu communication module, a WAVE communication module, an ITS-G5 communication module, an ITS/ETC communication module, and a DSRC communication module.

The NR Uu communication module includes an NR uplink communication module and an NR downlink communication module.

The LTE Uu communication module includes an LTE uplink communication module and an LTE downlink communication module.

In some embodiments of the present disclosure, the resource candidate information of the communication mode corresponding to the first internal communication module includes at least one of the following:

1) Resource allocation information of the resource pool.

The resource refers to the usable or recommended transmission resource and/or monitoring resource of the communication mode corresponding to the first internal communication module. The transmission resource is the sending resource and the monitoring resource is the receiving resource.

2) Synchronized information of the candidate transmission resource.

3) Synchronized information of the reserved transmission resource.

The synchronized information stated in 2) and 3) includes at least one of the following: synchronization source, synchronization signal, and timing information. The timing information refers to the timing alignment information of the receiving and sending terminals.

4) At least one of the following: timing domain information, frequency domain information, and spatial domain information for the candidate transmission resource.

5) At least one of the following: timing domain information, frequency domain information, and spatial domain information for the reserved transmission resource.

6) At least one of the following: timing domain information, frequency domain information, and spatial domain information for the candidate monitoring resource.

7) At least one of the following: timing domain information, frequency domain information, and spatial domain information for the reserved monitoring resource.

The timing domain information stated in 4)-7) includes at least one of the following: offset information, duration information, cycle, pattern information, and so on. The duration is the time of duration of the resource, usually indicated by multiple OFDM symbols, time slots, subframes, and so on.

The frequency domain information stated in 4)-7) includes at least one of the following: frequency point, subcarrier spacing, resource block location, and so on.

The spatial domain information stated in 4)-7) includes beam information and so on.

8) Power allocation information for the candidate transmission resource.

9) Power allocation information for the reserved transmission resource.

The power allocation information stated in 8) and 9) includes at least one of the following: allocated power, power headroom, and so on.

In some embodiments of the present disclosure, the resource sensing information of the another communication mode includes at least one of the following:

1) Interference information.

The interference information can include at least one of the following: interference timing domain information, interference band information, interference carrier information, interference spatial domain information, interference direction, interference type, and interference source.

Interference timing domain information includes at least one of the following: interference timing domain pattern information, interference timing domain offset information, duration, cycle, and so on.

The interference spatial domain information can include interference beam information.

The interference direction can include at least one of the following: uplink direction, downlink direction, sidelink direction, and so on.

The interference type can include at least one of the following: WAVE, ITS-G5, ITS/ETC, DSRC, and so on.

2) Channel occupancy rate.

3) Channel busy rate.

FIG. 4 is a fourth schematic flowchart of a multi-mode communication method according to an embodiment of the present disclosure. The multi-mode communication method is applied to a terminal, where the terminal supports at least two communication modes and the method includes the following step:

Step 41: A terminal sends the resource related information to another terminal. The resource related information includes resource indication information.

In an embodiment of the present disclosure, a terminal sends the resource indication information to another terminal, so that the another terminal can perform corresponding operations, reduce or avoid multi-mode data sending and receiving confliction and/or power limitation and interference problems, and improve communication efficiency according to the resource indication information.

In some embodiments of the present disclosure, the resource indication information includes at least one of the following:

1) Reserved transmission resource of the terminal.

The reserved transmission resource can be transmission resource with some special purposes, such as transmission resource for broadcast and/or transmission resource for unicast between terminals.

2) At least one of the following: timing domain information, frequency domain information, and spatial domain information for candidate transmission resource of another communication mode.

3) At least one of the following: timing domain information, frequency domain information, and spatial domain information for reserved transmission resource of another communication mode.

4) Interference information of another communication mode.

Such as intra-frequency interference information, adjacent frequency interference information, and so on.

5) At least one of the following: timing domain information, frequency domain information, and spatial domain information for the reserved monitoring resource of the terminal.

The another communication mode are the communication modes except those between the terminal and the another terminal among the at least two communication modes.

FIG. 5 is a fifth schematic flowchart of a multi-mode communication method according to an embodiment of the present disclosure. The multi-mode communication method is applied to a network side device and the method includes the following steps:

Step 51: Receive resource related information from a terminal, where the terminal supports at least two communication modes, and the resource related information includes resource related information of at least one of the at least two communication modes.

Step 52: Schedule the data of the at least one of the at least two communication modes for the terminal according to the resource related information.

In an embodiment of the present disclosure, a network side device receives the resource candidate information and/or resource sensing information of another communication mode from a terminal, and then effectively coordinates the communications among different communication modes, reduces or avoids multi-mode data sending and receiving confliction and/or power limitation and interference problems, and improves communication efficiency according to the resource candidate information and/or resource sensing information.

In some embodiments of the present disclosure, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

In some embodiments of the present disclosure, the resource related information includes at least one of the following: resource candidate information and resource sensing information of another communication mode;

The another communication mode refers to part or all of the communication modes except the first communication mode among the at least two communication modes. The first communication mode is the communication mode between the terminal and network side device.

In some embodiments of the present disclosure, the resource candidate information includes at least one of the following:

resource allocation information of the resource pool;

synchronized information of the candidate transmission resource;

synchronized information of the reserved transmission resource;

at least one of the following: timing domain information, frequency domain information, and spatial domain information for the candidate transmission resource;

at least one of the following: timing domain information, frequency domain information, and spatial domain information for the reserved transmission resource;

at least one of the following: timing domain information, frequency domain information, and spatial domain information for the candidate monitoring resource;

at least one of the following: timing domain information, frequency domain information, and spatial domain information for the reserved monitoring resource;

power allocation information for the candidate transmission resource; and power allocation information for the reserved transmission resource.

In some embodiments of the present disclosure, the resource sensing information includes at least one of the following:

interference information;

channel occupancy rate; and channel busy rate.

Figure 6:
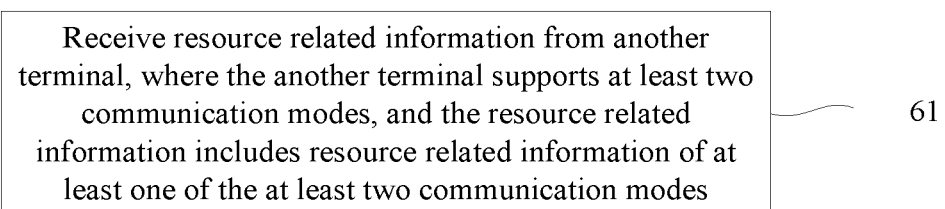
FIG. 6 is a sixth schematic flowchart of a multi-mode communication method according to an embodiment of the present disclosure.

FIG. 6 is a sixth schematic flowchart of a multi-mode communication method according to an embodiment of the present disclosure. The multi-mode communication method is applied to a terminal and includes the following step:

Step 61: Receive resource related information from another terminal, where the another terminal supports at least two communication modes, and the resource related information includes resource related information of at least one of the at least two communication modes.

In an embodiment of the present disclosure, a terminal receives the resource related information from another terminal, and then performs corresponding operations, reduces or avoids multi-mode data sending and receiving confliction and/or power limitation and interference problems, and improves communication efficiency according to the resource related information.

In some embodiments of the present disclosure, after the step of receiving resource related information from another terminal, the method further includes:

performing at least one of the following operations according to the resource related information: candidate resource allocation, reservation, measurement, sending and receiving, or data discarding.

Data discarding refers to discarding part or all of the data to be sent or received when there is confliction according to the reserved resource of the another terminal.

In some embodiments of the present disclosure, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

In some embodiments of the present disclosure, the resource related information includes resource indication information, which includes at least one of the following:

reserved transmission resource of the another terminal;

at least one of the following: timing domain information, frequency domain information, and spatial domain information for candidate transmission resource of another communication mode;

at least one of the following: timing domain information, frequency domain information, and spatial domain information for reserved transmission resource of another communication mode;

interference information of another communication mode; and at least one of the following: timing domain information, frequency domain information, and spatial domain information for reserved monitoring resource of the another terminal.

The another communication mode refers to part or all of the communication modes except the third communication mode among the at least two communication modes. The third communication mode is the communication mode between the terminal and the another terminal.

The following are some specific embodiments for explaining the multi-mode communication method.

Embodiment 1

The multi-mode communication method of this embodiment includes the following steps:

Step 71: A terminal configures and enables the NR sidelink, and LTE and NR multi-mode transmission is performed.

Step 72: The terminal enters the LTE network covered area. Sidelink resource allocation is performed for the terminal by the LTE network side device through the LTE Uu interface. The resource allocation mode is the LTE scheduled resource allocation mode.

The design of LTE sidelink supports two types of resource allocation mode: scheduled resource allocation mode and autonomous resource selection mode. The scheduled resource allocation mode is controlled by the network side device and allocates resource for each UE. For the autonomous resource selection mode, the resource is selected by UE autonomously.

Step 73: The terminal reports the resource candidate information of the NR sidelink communication mode to the LTE network side device. The resource candidate information includes:

a. Resource allocation information of the resource pool.

b. Synchronized information of the candidate transmission resource or reserved transmission resource.

The synchronized information includes at least one of the following: synchronization source, synchronization signal, and timing information.

c. At least one of the following: timing domain information, frequency domain information, and spatial domain information for the reserved transmission resource.

The timing domain information can include at least one of the following: offset information, duration information, cycle, pattern information, and so on. The duration is the time of duration of the resource, usually indicated by multiple orthogonal frequency division multiplexing (OFDM) symbols, time slots, sub-frames, and so on.

The frequency domain information can include at least one of the following: frequency point, subcarrier spacing, resource block location, and so on.

The spatial domain information can include beam information and so on.

d. Power allocation information for the reserved transmission resource.

The power allocation information can include at least one of the following: allocated power, power headroom, and so on.

Step 74: According to the reported resource candidate information, the LTE network side device schedules the data of the LTE downlink communication mode, LTE uplink communication mode, and NR sidelink communication mode for the terminal, so that the confliction of data transmitting or receiving by the terminal by using different modes, power shortage, and so on can be avoided.

The foregoing is an example for the LTE side network, for the NR side network, the situation is the same.

This method is also applicable for a network side device that does not support sidelink, or the situation when the scheduled resource allocation mode is not enabled. In this situation, the network side device still can schedule the sending or receiving of the uplink and downlink data according to the resource candidate information reported by the terminal, and avoid confliction or interference between the uplink and downlink data and NR sidelink transmission.

Embodiment 2

The multi-mode communication method of this embodiment includes the following steps:

Step 81: A terminal configures and enables the NR sidelink, and LTE and NR multi-mode transmission is performed.

Step 82: The terminal enters the LTE network covered area. Sidelink resource allocation is performed for the terminal by the LTE network side device through the LTE Uu interface. The resource allocation mode is the LTE scheduled resource allocation mode.

Step 83: The terminal reports the resource sensing information of the NR sidelink communication mode to the LTE network side device. The resource sensing information includes:

a. channel occupancy rate and channel busy rate for the NR sidelink communication mode.

b. interference pattern of the NR sidelink communication mode transmission to the carrier of the LTE downlink communication mode, LTE uplink communication mode, and LTE sidelink communication mode.

c. channel occupancy rate of other signal sources (such as ITS-G5 or ITS/ETC); and d. interference pattern of other signal source transmission to the carrier of the LTE downlink communication mode, LTE uplink communication mode, and LTE sidelink communication mode.

Step 84: According to the reported resource sensing information, the network side device schedules the data of the LTE downlink communication mode, LTE uplink communication mode, and LTE sidelink communication mode for the terminal, thereby trying to select resources having less interference and lower occupancy rate to send data to avoid interference from another signal.

The foregoing is an example for the LTE side network, for the NR side network, the situation is the same.

This method is also applicable for a network side device that does not support sidelink, or the situation when the scheduled resource allocation mode is not enabled. In this situation, the network side device still can schedule the sending or receiving of the uplink and downlink data according to the resource sensing information reported by the terminal, and avoid confliction or interference between the uplink and downlink data and NR sidelink transmission.

Embodiment 3

The multi-mode communication method of this embodiment includes the following steps:

Step 91: A terminal configures and enables sidelink and its autonomous resource selection mode, and LTE and NR multi-mode transmission is performed. The terminal performs resource sensing on LTE and NR sidelink.

The resource sensing includes monitoring and receiving data, obtaining reserved resource information of another terminal, detecting the interference situation and occupancy rate of a channel, and so on.

Step 92: The sending terminal sends resource indication information through the NR sidelink interface, including:

a. reserved transmission resource for multicast and/or unicast for the terminal;

b. reserved monitoring resource for multicast and/or unicast for the terminal, including timing domain information, frequency domain information, and/or spatial domain information.

c. timing domain information and/or frequency domain information for reserved transmission resource of LTE sidelink communication mode.

d. interference information (intra-frequency interference information or adjacent frequency interference information, and so on) that might be brought by the transmission of LTE sidelink communication mode to the NR sidelink communication mode.

Step 93: The receiving terminal receives the resource indication information sent by the sending terminal and performs the following operations:

a. During the candidate resource selection and resource reservation process, the receiving terminal decreases the priority of the resource that might be interfered.

b. Perform measurement by avoiding the resource that might be interfered.

c. Prefer using the resource indicated by the resource indication information to perform multicast and/or unicast communication with the sending terminal.

Figure 7:
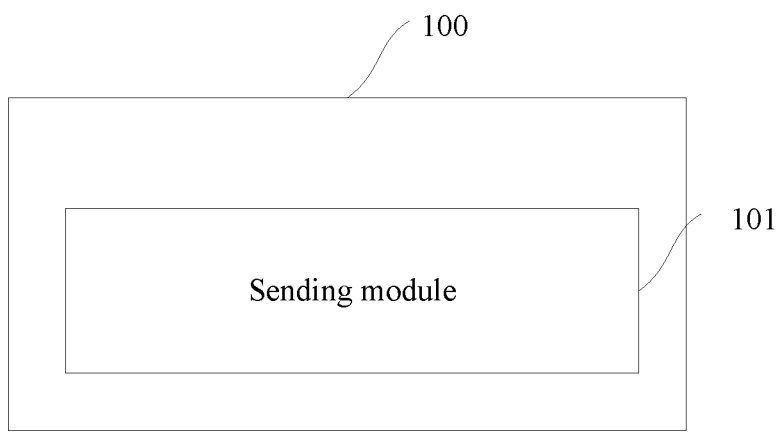
FIG. 7 is a first schematic structural diagram of a terminal according to an embodiment of the present disclosure.

FIG. 7 is a first schematic structural diagram of a terminal according to an embodiment of the present disclosure. The terminal 100 supports at least two communication modes and includes:

a sending module 101, configured to send resource related information. The resource related information includes resource related information of at least one of the at least two communication modes.

In an embodiment of the present disclosure, a terminal sends resource related information of at least one of the at least two communication modes, and the terminal that receives the resource related information can effectively coordinate the communications among different communication modes, reduce or avoid multi-mode data sending and receiving confliction and/or power limitation and interference problems, and improve communication efficiency according to the resource related information.

In some embodiments of the present disclosure, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

The NR Uu communication mode includes: an NR uplink communication mode and an NR downlink communication mode. NR Uu is an interface between a terminal and a network side device of an NR network.

The LTE Uu communication mode includes: an LTE uplink communication mode and an LTE downlink communication mode. LTE Uu is an interface between a terminal and a network side device of an LTE network.

In some embodiments of the present disclosure, the sending resource related information includes: sending, by the terminal, resource related information to a network side device.

The resource related information includes at least one of the following: the resource candidate information and the resource sensing information of another communication mode. The another communication mode refers to part or all of the communication modes except the first communication mode among the at least two communication modes. The first communication mode is the communication mode between the terminal and the network side device.

In some embodiments of the present disclosure, the sending resource related information includes: sending, by the first internal communication module of the terminal, the resource related information to the second internal communication module of the terminal. The terminal includes at least two internal communication modules. Every internal communication module is corresponding to a communication mode. The second internal communication module refers to part or all of the internal communication modules except the first internal communication module among the at least two communication modules.

The resource related information includes at least one of the following: the resource candidate information of the second communication mode and the resource sensing information of another communication mode. The second communication mode is the communication mode corresponding to the first internal communication module. The another communication mode refers to part or all of the communication modes except the second communication mode among the at least two communication modes.

In some embodiments of the present disclosure, the resource candidate information includes at least one of the following:

resource allocation information of the resource pool;

synchronized information of the candidate transmission resource;

synchronized information of the reserved transmission resource;

at least one of the following: timing domain information, frequency domain information, and spatial domain information for the candidate transmission resource;

at least one of the following: timing domain information, frequency domain information, and spatial domain information for the reserved transmission resource;

at least one of the following: timing domain information, frequency domain information, and spatial domain information for the candidate monitoring resource;

at least one of the following: timing domain information, frequency domain information, and spatial domain information for the reserved monitoring resource;

power allocation information for the candidate transmission resource; and power allocation information for the reserved transmission resource.

In some embodiments of the present disclosure, the resource sensing information includes at least one of the following:

interference information;

channel occupancy rate; and channel busy rate.

In some embodiments of the present disclosure, the sending resource related information includes: sending, by the terminal, resource related information to another terminal. The resource related information includes resource indication information.

In some embodiments of the present disclosure, the resource indication information includes at least one of the following:

reserved transmission resource of the terminal;

at least one of the following: timing domain information, frequency domain information, and spatial domain information for candidate transmission resource of another communication mode;

at least one of the following: timing domain information, frequency domain information, and spatial domain information for reserved transmission resource of another communication mode;

interference information of another communication mode; and at least one of the following: timing domain information, frequency domain information, and spatial domain information for the reserved monitoring resource of the terminal.

The another communication mode refers to part or all of the communication modes except the third communication mode among the at least two communication modes, and the third communication mode is the communication mode between the terminal and the another terminal.

Figure 8:
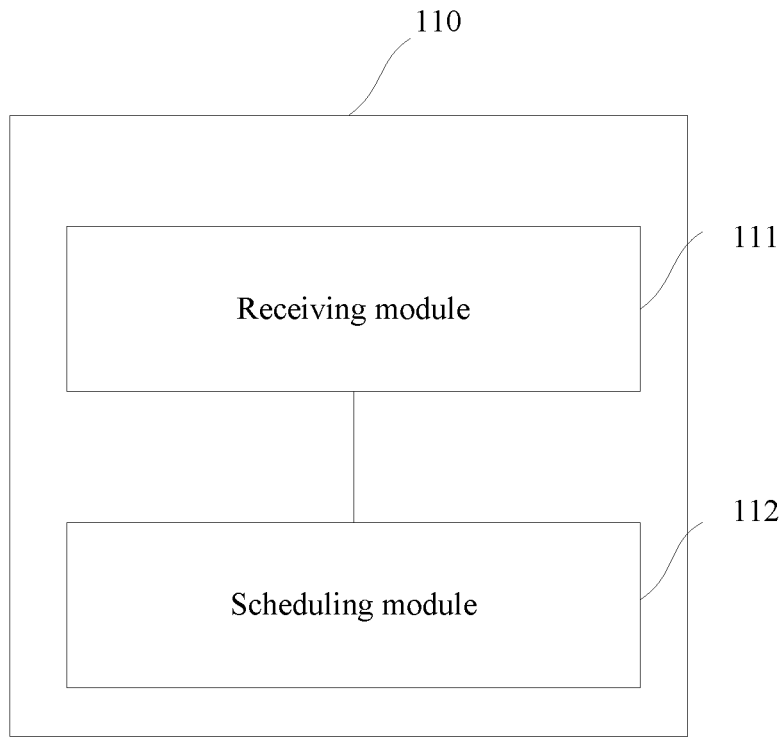
FIG. 8 is a first schematic structural diagram of a network side device according to an embodiment of the present disclosure.

FIG. 8 is a first schematic structural diagram of a network side device according to an embodiment of the present disclosure. The network side device 110 includes:

a receiving module 111, configured to receive resource related information from a terminal, where the terminal supports at least two communication modes, and the resource related information includes resource related information of at least one of the at least two communication modes; and a scheduling module 112, configured to perform data scheduling for at least one of the at least two communication modes according to the resource related information.

In an embodiment of the present disclosure, a network side device receives the resource candidate information and/or resource sensing information of another communication mode sent by a terminal, and effectively coordinates the communications among different communication modes, reduces or avoids multi-mode data sending and receiving confliction and/or power limitation and interference problems, and improves communication efficiency according to the resource candidate information and/or resource sensing information.

In some embodiments of the present disclosure, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

In some embodiments of the present disclosure, the resource related information includes at least one of the following: resource candidate information and resource sensing information of another communication mode;

The another communication mode refers to part or all of the communication modes except the first communication mode among the at least two communication modes. The first communication mode is the communication mode between the terminal and the network side device.

In some embodiments of the present disclosure, the resource candidate information includes at least one of the following:

resource allocation information of the resource pool;

synchronized information of the candidate transmission resource;

synchronized information of the reserved transmission resource;

at least one of the following: timing domain information, frequency domain information, and spatial domain information for the candidate transmission resource;

at least one of the following: timing domain information, frequency domain information, and spatial domain information for the reserved transmission resource;

at least one of the following: timing domain information, frequency domain information, and spatial domain information for the candidate monitoring resource;

at least one of the following: timing domain information, frequency domain information, and spatial domain information for the reserved monitoring resource;

power allocation information for the candidate transmission resource;

power allocation information for the reserved transmission resource.

In some embodiments of the present disclosure, the resource sensing information includes at least one of the following:

interference information;

channel occupancy rate; and channel busy rate.

Figure 9:
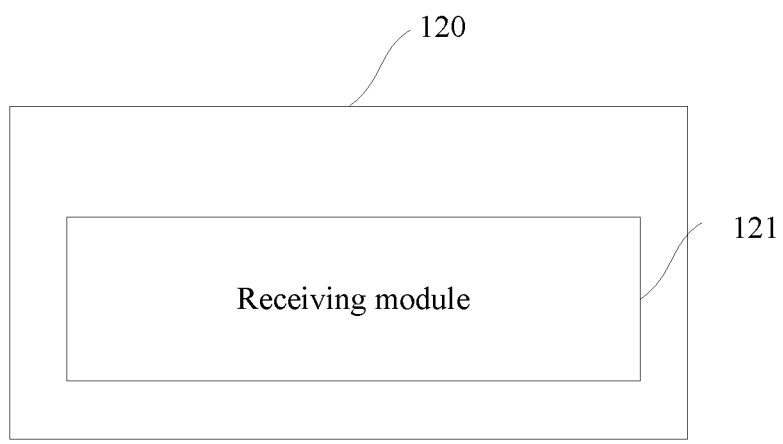
FIG. 9 is a second schematic structural diagram of a terminal according to an embodiment of the present disclosure.

FIG. 9 is a second schematic structural diagram of a terminal according to an embodiment of the present disclosure. The terminal 120 includes:

a receiving module 121, configured to receive resource related information from another terminal, where the another terminal supports at least two communication modes, and the resource related information includes resource related information of at least one of the at least two communication modes.

In an embodiment of the present disclosure, a terminal receives the resource related information from the another terminal, and then performs corresponding operations, reduces or avoids multi-mode data sending and receiving confliction and/or power limitation and interference problems, and improves communication efficiency according to the resource related information.

In some embodiments of the present disclosure, the terminal 120 further includes:

an execution module, configured to execute at least one of the following operations according to the resource related information: candidate resource allocation, reservation, measurement, sending and receiving, or data discarding.

In some embodiments of the present disclosure, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

In some embodiments of the present disclosure, the resource related information includes resource indication information, which includes at least one of the following:

reserved transmission resource of the another terminal;

at least one of the following: timing domain information, frequency domain information, and spatial domain information for candidate transmission resource of another communication mode;

at least one of the following: timing domain information, frequency domain information, and spatial domain information for reserved transmission resource of another communication mode;

interference information of another communication mode; and at least one of the following: timing domain information, frequency domain information, and spatial domain information for reserved monitoring resource of the another terminal.

The another communication mode refers to part or all of the communication modes except the third communication mode among the at least two communication modes, and the third communication mode is the communication mode between the terminal and the another terminal.

Figure 10:
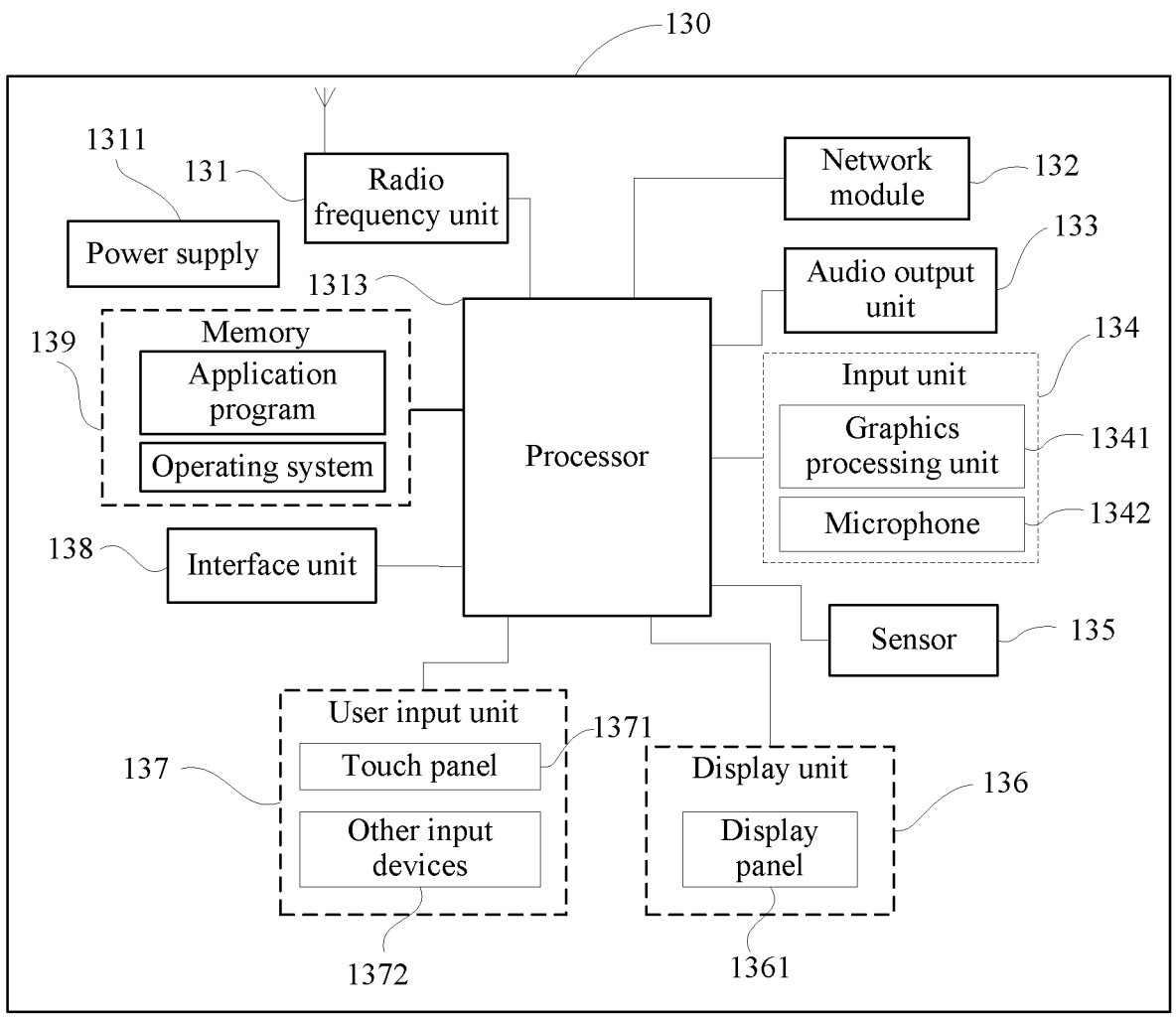
FIG. 10 is a third schematic structural diagram of a terminal according to an embodiment of the present disclosure.

FIG. 10 is a third schematic structural diagram of a terminal according to an embodiment of the present disclosure. The terminal 130 includes but is not limited to the following components: a radio frequency unit 131, a network module 132, an audio output unit 133, an input unit 134, a sensor 135, a display unit 136, a user input unit 137, an interface unit 138, a memory 139, a processor 1313, a power supply 1311, and so on. A person skilled in the art may understand that the structure of the terminal shown in FIG. 13 does not constitute a limitation to the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, a vehicle-mounted terminal, a wearable device, a pedometer, or the like.

The terminal supports at least two communication modes. The radio frequency unit 131 is configured to send resource related information. The resource related information includes resource related information of at least one of the at least two communication modes.

Or the radio frequency unit 131 is configured to receive resource related information from another terminal, where the another terminal supports at least two communication modes, and the resource related information includes resource related information of at least one of the at least two communication modes.

In an embodiment of the present disclosure, a terminal sends resource related information of at least one of the at least two communication modes, and the equipment that receives the resource related information can effectively coordinate the communications among different communication modes, reduce or avoid multi-mode data sending and receiving confliction and/or power limitation and interference problems, and improve communication efficiency according to the resource related information.

It should be understood that in some embodiments of the present disclosure, the radio frequency unit 131 may be configured to receive and send information or receive and send a signal in a call process. Specifically, after receiving downlink data from a base station, the radio frequency unit 131 sends the downlink data to the processor 1313 for processing. In addition, the radio frequency unit 131 sends uplink data to the base station. Generally, the radio frequency unit 131 includes but is not limited to an antenna, at least one amplifier, a transceiver, a coupler, a low noise amplifier, a duplexer, and the like. In addition, the radio frequency unit 131 may further communicate with a network and another device by using a wireless communication system.

The terminal provides a user with wireless broadband Internet access through the network module 132, for example, helps the user send and receive emails, browse web pages, and access streaming media.

The audio output unit 133 may convert audio data received by the radio frequency unit 131 or the network module 132 or stored in the memory 139 into an audio signal and output the audio signal as a sound. Moreover, the audio output unit 133 may further provide an audio output (for example, call signal receiving sound and message receiving sound) related to a specific function performed by the terminal 130. The audio output unit 133 includes a speaker, a buzzer, a receiver, and the like.

The input unit 134 is configured to receive an audio signal or a video signal. The input unit 134 may include a graphics processing unit (GPU) 1341 and a microphone 1342. The graphics processing unit 1341 processes image data of a static picture or a video obtained by an image capturing apparatus (for example, a camera) in a video capturing mode or an image capturing mode. A processed image frame can be displayed on the display unit 136. The image frame processed by the graphics processing unit 1341 can be stored in the memory 139 (or another storage medium) or sent by the radio frequency unit 131 or the network module 132. The microphone 1342 can receive sound, and can process such sound into audio data. The processed audio data can be converted, in a telephone calling mode, into a format that can be sent by the radio frequency unit 131 to a mobile communications base station for output.

The terminal 130 further includes at least one sensor 135, such as a light sensor, a motion sensor, and other sensors. Specifically, the light sensor includes an ambient light sensor and a proximity sensor, where the ambient light sensor can adjust brightness of the display panel 1361 according to brightness of ambient light, and the proximity sensor can turn off the display panel 1361 and/or backlight when the terminal 130 moves towards the ear. As a type of motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 135 may further include a fingerprint sensor, a pressure sensor, an iris sensor, a molecule sensor, a gyroscope, a barometer, a hygrometer, a thermometer, and an infrared sensor. Details are not described herein.

The display unit 136 is configured to display information entered by a user or information provided for the user. The display unit 136 may include a display panel 1361, and the display panel 1361 may be configured in a form of a liquid crystal display (LCD), an organic light-emitting diode (OLED), or the like.

The user input unit 137 can be configured to receive input numeric or character information, and generate key signal inputs related to user settings and function control of the terminal. Specifically, the user input unit 137 includes a touch panel 1371 and another input device 1372. The touch panel 1371, also called a touch screen, can collect a touch operation of the user on or near the touch panel 1371 (For example, the user uses any suitable object or accessory such as a finger or a stylus to operate on or near the touch panel 1371). The touch panel 1371 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1313, and receives and executes a command from the processor 1313. In addition, the touch panel 1371 may be implemented by using a plurality of types such as a resistive type, a capacitive type, an infrared ray, and a surface acoustic wave. In addition to the touch panel 1371, the user input unit 137 may further include the another input device 1372. Specifically, the other input devices 1372 may include but are not limited to a physical keyboard, function keys (such as a volume control key and an on/off key), a trackball, a mouse, and a joystick. Details are not described herein.

Figure 13:
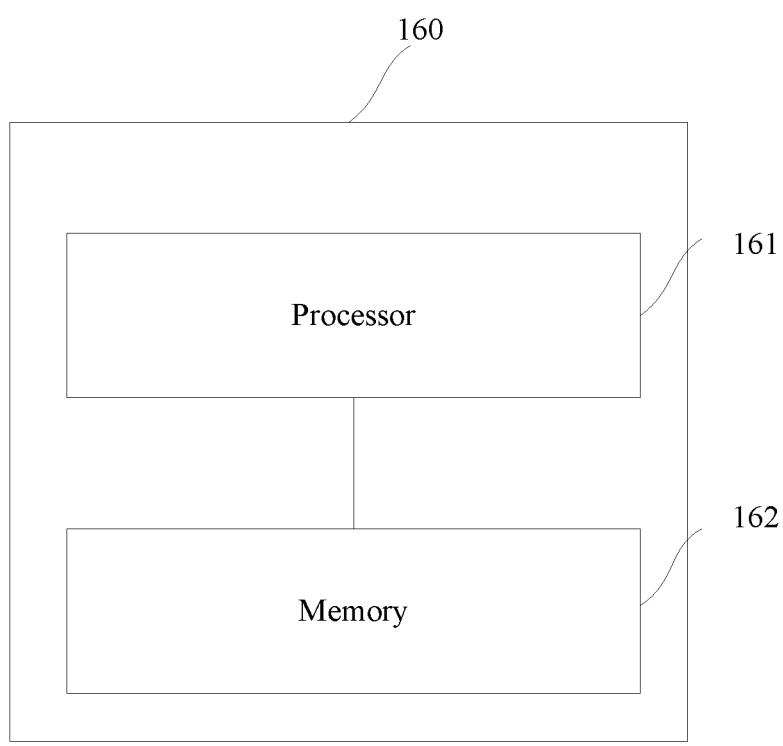
FIG. 13 is a fifth schematic structural diagram of a terminal according to an embodiment of the present disclosure.

Further, the touch panel 1371 may cover the display panel 1361. When the touch panel 1371 detects a touch operation on or near the touch panel 1371, the touch operation is transmitted to the processor 1313 to determine a type of a touch event, and then the processor 1313 provides a corresponding visual output on the display panel 1361 according to the type of the touch event. In FIG. 13, the touch panel 1371 and the display panel 1361 are used as two independent components to implement input and output functions of the user equipment. However, in some embodiments, the touch panel 1371 and the display panel 1361 may be integrated to implement the input and output functions of the user equipment. This is not specifically limited herein.

The interface unit 138 is an interface for connecting an external apparatus to the terminal 130. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 138 may be configured to receive input (for example, data information and power) from an external apparatus and transmit the received input to one or more elements within the terminal 130, or may be configured to transmit data between the terminal 130 and the external apparatus.

The memory 139 may be configured to store software programs and various data. The memory 139 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 139 may include a high-speed random access memory or a nonvolatile memory, for example, at least one disk storage device, a flash memory, or another volatile solid-state storage device.

The processor 1313 is a control center of the terminal. The processor 1313 uses various interfaces and lines to connect the various parts of the entire terminal, and performs various functions of the terminal and processes data by running or executing software programs and/or modules stored in the memory 139 and invoking data stored in the memory 139, to monitor the terminal as a whole. The processor 1313 may include one or more processing units. Optionally, the processor 1313 may integrate an application processor and a modem processor. The application processor mainly deals with an operating system, a user interface, and an application program. The modem processor mainly deals with wireless communication. It may be understood that the modem processor may not be integrated into the processor 1313.

The terminal 130 may further include a power supply 1311 (for example, a battery) that supplies power to various components. Optionally, the power supply 1311 may be logically connected to the processor 1313 through a power supply management system, to perform functions of managing charging, discharging, and power consumption through the power supply management system.

In addition, the terminal 130 includes some function modules not shown, and details are not described herein.

Figure 11:
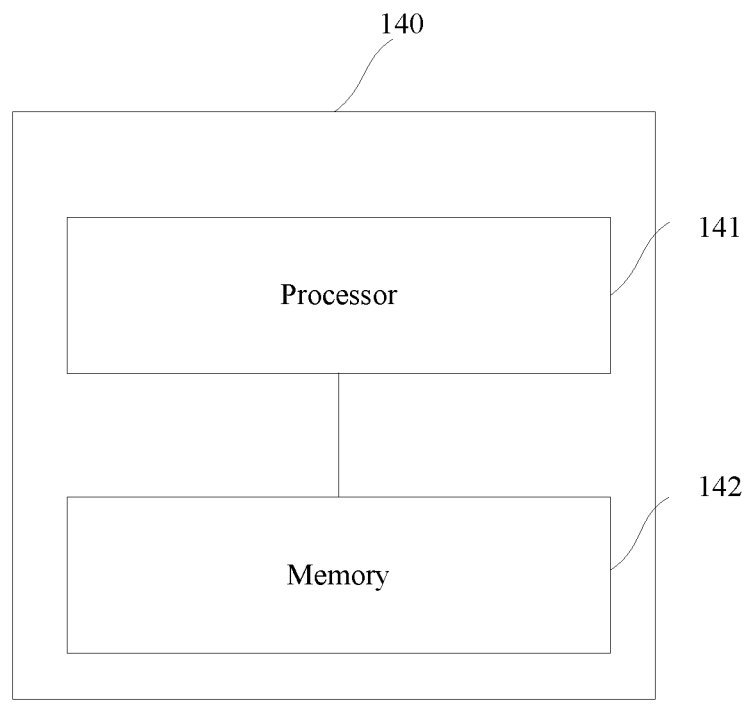
FIG. 11 is a fourth schematic structural diagram of a terminal according to an embodiment of the present disclosure.

FIG. 11 is a fourth schematic structural diagram of a terminal according to an embodiment of this disclosure. The terminal 140 supports at least two communication modes and includes: a processor 141 and a memory 142. In some embodiments of the present disclosure, the terminal 140 further includes: a computer program stored in the memory 142 and executable on the processor 141. When the computer program is executed by the processor 141, the step of sending resource related information is performed. The resource related information includes resource related information of at least one of the at least two communication modes.

The processor 141 is responsible for management of the bus architecture and general processing. The memory 142 may store data used by the processor 141 when operations are performed.

Optionally, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

Optionally, when the computer program is executed by the processor 141, the following steps may be further performed:

The step of sending resource related information includes: sending the resource related information to the network side device.

The resource related information includes at least one of the following: the resource candidate information and the resource sensing information of another communication mode. The another communication mode refers to part or all of the communication modes except the first communication mode among the at least two communication modes. The first communication mode is the communication mode between the terminal and the network side device.

Optionally, when the computer program is executed by the processor 141, the following steps may be further performed:

The step of sending resource related information includes: sending, by the first internal communication module of the terminal, the resource related information to the second internal communication module of the terminal. The terminal includes at least two internal communication modules. Every internal communication module is corresponding to a communication mode. The second internal communication module refers to part or all of the internal communication modules except the first internal communication module among the at least two communication modules.

The resource related information includes at least one of the following: the resource candidate information of the second communication mode and the resource sensing information of another communication mode. The second communication mode is the communication mode corresponding to the first internal communication module. The another communication mode refers to part or all of the communication modes except the second communication mode among the at least two communication modes.

Optionally, the resource candidate information includes at least one of the following:

resource allocation information of the resource pool;

synchronized information of the candidate transmission resource;

synchronized information of the reserved transmission resource;

at least one of the following: timing domain information, frequency domain information, and spatial domain information for the candidate transmission resource;

at least one of the following: timing domain information, frequency domain information, and spatial domain information for the reserved transmission resource;

at least one of the following: timing domain information, frequency domain information, and spatial domain information for the candidate monitoring resource;

at least one of the following: timing domain information, frequency domain information, and spatial domain information for the reserved monitoring resource;

power allocation information for the candidate transmission resource; and power allocation information for the reserved transmission resource.

Optionally, the resource sensing information includes at least one of the following:

interference information;

channel occupancy rate; and channel busy rate.

Optionally, when the computer program is executed by the processor 141, the following steps may be further performed:

The step of sending resource related information includes: sending resource related information to another terminal. The resource related information includes resource indication information.

Optionally, the resource indication information includes at least one of the following:

reserved transmission resource of the terminal;

at least one of the following: timing domain information, frequency domain information, and spatial domain information for candidate transmission resource of another communication mode;

at least one of the following: timing domain information, frequency domain information, and spatial domain information for reserved transmission resource of another communication mode;

interference information of another communication mode; and at least one of the following: timing domain information, frequency domain information, and spatial domain information for the reserved monitoring resource of the terminal.

The another communication mode refers to part or all of the communication modes except the third communication mode among the at least two communication modes. The third communication mode is the communication mode between the terminal and the another terminal.

Figure 12:
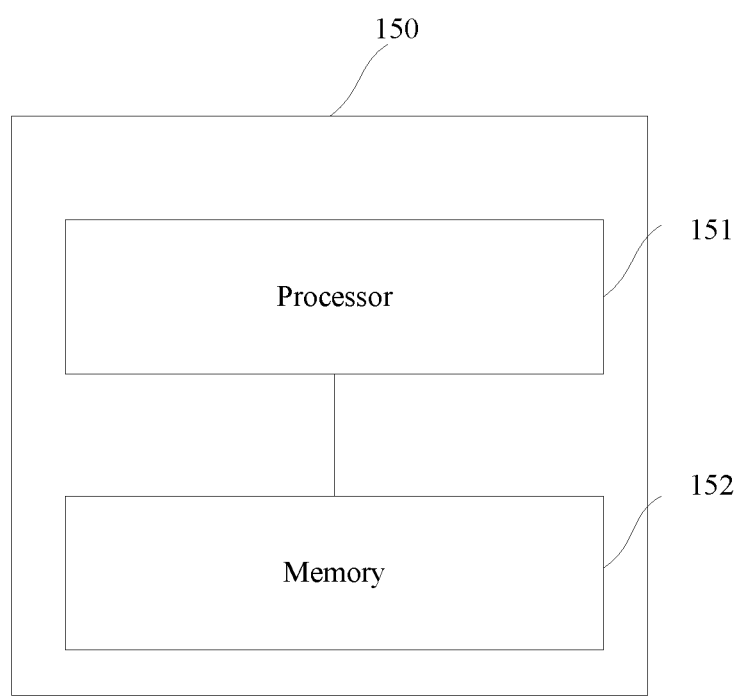
FIG. 12 is a second schematic structural diagram of a network side device according to an embodiment of the present disclosure.

FIG. 12 is a second schematic structural diagram of a network side device according to an embodiment of the present disclosure. The network side device 150 includes: a processor 151 and a memory 152. In some embodiments of the present disclosure, the network side device 150 further includes: a computer program stored in the memory 152 and executable on the processor 151. When the computer program is executed by the processor 151, the following steps are performed:

receiving resource related information from a terminal, where the terminal supports at least two communication modes, and the resource related information includes resource related information of at least one of the at least two communication modes; and scheduling the data of the at least one of the at least two communication modes for the terminal according to the resource related information.

The processor 151 is responsible for management of the bus architecture and general processing. The memory 152 may store data used by the processor 151 when operations are performed.

Optionally, the at least two communication modes include at least two of the following: an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

Optionally, the resource related information includes at least one of the following: resource candidate information and resource sensing information of another communication mode.

The another communication mode refers to part or all of the communication modes except the first communication mode among the at least two communication modes. The first communication mode is the communication mode between the terminal and the network side device.

Optionally, the resource candidate information includes at least one of the following:

resource allocation information of the resource pool;

synchronized information of the candidate transmission resource;

synchronized information of the reserved transmission resource;

at least one of the following: timing domain information, frequency domain information, and spatial domain information for the candidate transmission resource;

at least one of the following: timing domain information, frequency domain information, and spatial domain information for the reserved transmission resource;

at least one of the following: timing domain information, frequency domain information, and spatial domain information for the candidate monitoring resource;

at least one of the following: timing domain information, frequency domain information, and spatial domain information for the reserved monitoring resource;

power allocation information for the candidate transmission resource;

power allocation information for the reserved transmission resource.

Optionally, the resource sensing information includes at least one of the following:

interference information;

channel occupancy rate; and channel busy rate.

FIG. 13 is a fifth schematic structural diagram of a terminal according to an embodiment of the present disclosure. The terminal 160 includes: a processor 161 and a memory 162. In some embodiments of the present disclosure, the terminal 160 further includes: a computer program stored in the memory 162 and executable on the processor 161. When the computer program is executed by the processor 161, the following step is performed:

receiving resource related information from another terminal, where the another terminal supports at least two communication modes. The resource related information includes resource related information of at least one of the at least two communication modes.

The processor 161 is responsible for management of the bus architecture and general processing. The memory 162 may store data used by the processor 161 when operations are performed.

Optionally, when the computer program is executed by the processor 161, the following steps may be further performed:

After receiving resource related information from another terminal, the following step is further included:

performing at least one of the following operations according to the resource related information: candidate resource allocation, reservation, measurement, sending and receiving, or data discarding.

Optionally, the at least two communication modes include at least two of the following:

an NR sidelink communication mode, an LTE sidelink communication mode, an NR Uu communication mode, an LTE Uu communication mode, a WAVE communication mode, an ITS-G5 communication mode, an ITS/ETC communication mode, and a DSRC communication mode.

Optionally, the resource related information includes resource indication information, which includes at least one of the following:

reserved transmission resource of the another terminal;

at least one of the following: timing domain information, frequency domain information, and spatial domain information for candidate transmission resource of another communication mode;

at least one of the following: timing domain information, frequency domain information, and spatial domain information for reserved transmission resource of another communication mode;

interference information of another communication mode; and at least one of the following: timing domain information, frequency domain information, and spatial domain information for reserved monitoring resource of the another terminal.

The another communication mode refers to part or all of the communication modes except the third communication mode among the at least two communication modes. The third communication mode is the communication mode between the terminal and the another terminal.

An embodiment of the present disclosure further provides a computer readable storage medium. The computer readable storage medium stores a computer program, and when the computer program is executed by the processor, the processes of the embodiments of the multi-mode communication method are implemented, and the same technical effects can be achieved. To avoid repetition, details are not described herein again. The computer readable storage medium may be a read-only memory (ROM), a random access memory (RAM), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. In the absence of more limitations, an element defined by "including a . . . " does not preclude the existence of other identical elements in the process, method, article, or apparatus that includes the element.

By means of the description of the embodiments, a person skilled in the art may clearly understand that the method in the embodiments may be implemented by software with a necessary general hardware platform. Certainly, the method in the embodiments may also be implemented by hardware. In some embodiments, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of this disclosure. The electronic hardware includes but is not limited to an electronic circuit, an application-specific integrated circuit, a programmable logic device, a programmable processor, and the like.

Those skilled in the art can clearly understand that to describe conveniently and concisely, for a specific working process of the system, apparatus, and unit described above, refer to the corresponding process in the method embodiments. Details are not described herein again.

In the embodiments provided by this disclosure, it should be understood that the disclosed apparatuses and methods may be implemented in other ways. For example, the apparatus embodiments described above are only an example. For example, the division of the units is only a logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of this disclosure may be integrated into one processing unit, or each unit may have separate physical existence, or two or more units may be integrated into one unit.

If the function is implemented in the form of software function units and sold or used as independent products, the function may be stored in a computer readable storage medium. Based on this understanding, the essence of the technical solutions of this disclosure, or the part contributing to the prior art, or some of the technical solutions may be presented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

Those of ordinary skill in the art can understand that part or all processes of the realization of the method in the embodiments can be implemented by controlling relevant hardware by the computer program. The program is stored on a computer readable storage medium, where when the program is executed, the processes of the method in the embodiments can be included. The storage medium can be a magnetic disk, an optical disc, a ROM, a RAM, or the like.

The embodiments of the present disclosure are described above with reference to the accompanying drawings, but the present disclosure is not limited to the specific implementations. The specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A multi-mode communication method applied to a terminal, wherein the terminal supports at least two communication modes and comprises at least two internal communication modules respectively corresponding to the at least two communication modes, and the method comprises:
 sending, by the terminal, resource related information, wherein the resource related information comprises resource related information of at least one of the at least two communication modes, wherein
 sending the resource related information comprises:
  sending, by a first internal communication module of the terminal, first resource related information to a second internal communication module of the terminal, wherein the second internal communication module refers to part or all of the at least two internal communication modules except the first internal communication module, wherein
   the first resource related information comprises at least one of the following: resource candidate information of a first communication mode and resource sensing information of part or all of the at least two communication modes except the first communication mode, wherein the first communication mode is a communication mode corresponding to the first internal communication module.

2. The multi-mode communication method according to claim 1, wherein the at least two communication modes comprise at least two of the following: an NR (New Radio) sidelink communication mode, an LTE (Long Term Evolution) sidelink communication mode, an NR Uu communication mode, an LTE Uu communication mode, a WAVE (Wireless Access in Vehicular Environments) communication mode, an ITS-G5 (Intelligent Transport Systems-G5) communication mode, an ITS/ETC (Intelligent Transport Systems/Electronic Toll Collection) communication mode, and a DSRC (Dedicated Short Range Communications) communication mode.

3. The multi-mode communication method according to claim 1, wherein sending the resource related information further comprises:
 sending, by the terminal, second resource related information to a network side device, wherein the second resource related information comprises at least one of the following: resource candidate information and resource sensing information of part or all of the at least two communication modes except a second communication mode, wherein the second communication mode is a communication mode between the terminal and the network side device.

4. The multi-mode communication method according to claim 3, wherein resource candidate information comprises at least one of the following:
 resource allocation information of a resource pool;
 synchronized information of a candidate transmission resource;
 synchronized information of a reserved transmission resource;
 at least one of the following: timing domain information, frequency domain information, and spatial domain information for the candidate transmission resource;
 at least one of the following: timing domain information, frequency domain information, and spatial domain information for the reserved transmission resource;
 at least one of the following: timing domain information, frequency domain information, and spatial domain information for a candidate monitoring resource;
 at least one of the following: timing domain information, frequency domain information, and spatial domain information for a reserved monitoring resource;
 power allocation information for the candidate transmission resource; and
 power allocation information for the reserved transmission resource.

5. The multi-mode communication method according to claim 3, wherein resource sensing information comprises at least one of the following:
   interference information;
   a channel occupancy rate; and
   a channel busy rate.

6. The multi-mode communication method according to claim 1, wherein sending the resource related information further comprises:
   sending, by the terminal, the resource related information to another terminal, wherein the resource related information further comprises resource indication information.

7. The multi-mode communication method according to claim 6, wherein the resource indication information comprises at least one of the following:
   a reserved transmission resource of the terminal;
   at least one of the following: timing domain information, frequency domain information, and spatial domain information for a candidate transmission resource of another communication mode;
   at least one of the following: timing domain information, frequency domain information, and spatial domain information for a reserved transmission resource of the another communication mode;
   interference information of the another communication mode; and
   at least one of the following: timing domain information, frequency domain information, and spatial domain information for a reserved monitoring resource for the terminal, wherein
      the another communication mode refers to part or all of the at least two communication modes except a communication mode between the terminal and the another terminal.

8. A terminal, comprising a processor, a memory, and a computer program stored in the memory and executable on the processor, wherein the computer program, when executed by the processor, causes the processor to implement operations comprising:
   sending, by the terminal, resource related information, wherein the terminal supports at least two communication modes and comprises at least two internal communication modules respectively corresponding to the at least two communication modes, and the resource related information comprises resource related information of at least one of the at least two communication modes, wherein
      sending the resource related information comprises:
         sending, by a first internal communication module of the terminal, first resource related information to a second internal communication module of the terminal, wherein the second internal communication module refers to part or all of the at least two internal communication modules except the first internal communication module, wherein
         the first resource related information comprises at least one of the following: resource candidate information of a first communication mode and resource sensing information of part or all of the at least two communication modes except the first communication mode, wherein the first communication mode is a communication mode corresponding to the first internal communication module.

9. The terminal according to claim 8, wherein the at least two communication modes comprise at least two of the following: an NR (New Radio) sidelink communication mode, an LTE (Long Term Evolution) sidelink communication mode, an NR Uu communication mode, an LTE Uu communication mode, a WAVE (Wireless Access in Vehicular Environments) communication mode, an ITS-G5 (Intelligent Transport Systems-G5) communication mode, an ITS/ETC (Intelligent Transport Systems/Electronic Toll Collection) communication mode, and a DSRC (Dedicated Short Range Communications) communication mode.

10. The terminal according to claim 8, wherein sending the resource related information further comprises:
   sending, by the terminal, second resource related information to a network side device, wherein the second resource related information comprises at least one of the following: resource candidate information and resource sensing information of part or all of the at least two communication modes except a second communication mode, wherein the second communication mode is a communication mode between the terminal and the network side device.

11. The terminal according to claim 10, wherein resource candidate information comprises at least one of the following:
   resource allocation information of a resource pool;
   synchronized information of a candidate transmission resource;
   synchronized information of a reserved transmission resource;
   at least one of the following: timing domain information, frequency domain information, and spatial domain information for the candidate transmission resource;
   at least one of the following: timing domain information, frequency domain information, and spatial domain information for the reserved transmission resource;
   at least one of the following: timing domain information, frequency domain information, and spatial domain information for a candidate monitoring resource;
   at least one of the following: timing domain information, frequency domain information, and spatial domain information for a reserved monitoring resource;
   power allocation information for the candidate transmission resource; and
   power allocation information for the reserved transmission resource.

12. The terminal according to claim 10, wherein resource sensing information comprises at least one of the following:
   interference information;
   a channel occupancy rate; and
   a channel busy rate.

13. The terminal according to claim 8, wherein sending the resource related information further comprises:
   sending, by the terminal, the resource related information to another terminal, wherein the resource related information further comprises resource indication information.

14. The terminal according to claim 13, wherein the resource indication information comprises at least one of the following:
   a reserved transmission resource of the terminal;
   at least one of the following: timing domain information, frequency domain information, and spatial domain information for a candidate transmission resource of another communication mode;
   at least one of the following: timing domain information, frequency domain information, and spatial domain information for a reserved transmission resource of the another communication mode;

interference information of the another communication mode; and at least one of the following: timing domain information, frequency domain information, and spatial domain information for the reserved monitoring resource for the terminal, wherein the another communication mode refers to part or all of the at least two communication modes except a communication mode between the terminal and the another terminal.

15. A non-transitory computer readable storage medium storing a computer program, wherein the computer program, when executed by a processor, causes the processor to implement operations comprising:

sending, by the terminal, resource related information, wherein the terminal supports at least two communication modes and comprises at least two internal communication modules respectively corresponding to the at least two communication modes, and the resource related information comprises resource related information of at least one of the at least two communication modes, wherein sending the resource related information comprises:
sending, by a first internal communication module of the terminal, first resource related information to a second internal communication module of the terminal, wherein the second internal communication module refers to part or all of the at least two internal communication modules except the first internal communication module, wherein the first resource related information comprises at least one of the following: resource candidate information of a first communication mode and resource sensing information of part or all of the at least two communication modes except the first communication mode, wherein the first communication mode is a communication mode corresponding to the first internal communication module.

16. The non-transitory computer readable storage medium according to claim 15, wherein the at least two communication modes comprise at least two of the following: an NR (New Radio) sidelink communication mode, an LTE (Long Term Evolution) sidelink communication mode, an NR Uu communication mode, an LTE Uu communication mode, a WAVE (Wireless Access in Vehicular Environments) communication mode, an ITS-G5 (Intelligent Transport Systems-G5) communication mode, an ITS/ETC (Intelligent Transport Systems/Electronic Toll Collection) communication mode, and a DSRC (Dedicated Short Range Communications) communication mode.

17. The non-transitory computer readable storage medium according to claim 15, wherein sending the resource related information further comprises:

sending, by the terminal, second resource related information to a network side device, wherein the second resource related information comprises at least one of the following: resource candidate information and resource sensing information of part or all of the at least two communication modes except a second communication mode, wherein the second communication mode is a communication mode between the terminal and the network side device.

18. The non-transitory computer readable storage medium according to claim 17, wherein resource candidate information comprises at least one of the following:

resource allocation information of a resource pool;
synchronized information of a candidate transmission resource;
synchronized information of a reserved transmission resource;
at least one of the following: timing domain information, frequency domain information, and spatial domain information for the candidate transmission resource;
at least one of the following: timing domain information, frequency domain information, and spatial domain information for the reserved transmission resource;
at least one of the following: timing domain information, frequency domain information, and spatial domain information for a candidate monitoring resource;
at least one of the following: timing domain information, frequency domain information, and spatial domain information for a reserved monitoring resource;
power allocation information for the candidate transmission resource; and
power allocation information for the reserved transmission resource.

19. The non-transitory computer readable storage medium according to claim 17, wherein resource sensing information comprises at least one of the following:
interference information;
a channel occupancy rate; and
a channel busy rate.

20. The non-transitory computer readable storage medium according to claim 15, wherein sending the resource related information further comprises:

sending, by the terminal, the resource related information to another terminal, wherein the resource related information further comprises resource indication information.

* * * * *